US006540451B1

(12) United States Patent
Mori

(10) Patent No.: US 6,540,451 B1
(45) Date of Patent: Apr. 1, 2003

(54) HOLE PUNCHING APPARATUS

(75) Inventor: Makoto Mori, Ichikawa (JP)

(73) Assignee: Carl Manufacturing Co., Ltd., Tokyo (JP)

(*) Notice: Subject to any disclaimer, the term of this patent is extended or adjusted under 35 U.S.C. 154(b) by 0 days.

(21) Appl. No.: 09/255,429

(22) Filed: Feb. 22, 1999

(51) Int. Cl.[7] .............................................. B23B 51/00

(52) U.S. Cl. ...................... 408/135; 408/136; 408/204; 83/164; 83/629

(58) Field of Search ......................... 83/164, 629, 644, 83/126, 145, 685, 690; 408/136, 135, 204, 205, 207, 67, 87, 206

(56) References Cited

U.S. PATENT DOCUMENTS

| | | | | | |
|---|---|---|---|---|---|
| 1,493,142 | A | * | 5/1924 | Bodmer | 408/136 |
| 1,557,464 | A | * | 10/1925 | Mick | 408/205 |
| 1,817,428 | A | * | 8/1931 | Takamatsu | 83/629 |
| 2,514,659 | A | * | 7/1950 | McClung | 83/126 |
| 2,528,282 | A | * | 10/1950 | Melberg | 83/629 X |
| 3,031,905 | A | * | 5/1962 | Phillips et al. | 83/86 |
| 3,320,843 | A | * | 5/1967 | Schott, Jr. | 83/620 |
| 4,131,042 | A | * | 12/1978 | Rich et al. | 83/126 X |
| 4,279,553 | A | * | 7/1981 | Cleary | 408/135 |
| 4,509,396 | A | * | 4/1985 | Schall et al. | 83/126 |
| 4,589,807 | A | * | 5/1986 | Martin | 408/205 |
| 4,607,553 | A | * | 8/1986 | Hartzell | 83/164 |
| 4,632,611 | A | * | 12/1986 | Burns | 408/205 |
| 4,726,273 | A | * | 2/1988 | Miceli | 83/629 |
| 5,062,743 | A | * | 11/1991 | Wieland et al. | 408/135 X |
| 5,090,279 | A | * | 2/1992 | Enzinger | 408/135 X |
| 5,178,049 | A | * | 1/1993 | Tsai-Hsin | 83/164 |
| 5,664,473 | A | * | 9/1997 | Huang | 83/167 X |
| 5,902,076 | A | * | 5/1999 | Miller et al. | 408/135 X |

* cited by examiner

*Primary Examiner*—Kenneth E. Peterson
(74) *Attorney, Agent, or Firm*—Wood, Phillips, Katz, Clark & Mortimer

(57) ABSTRACT

A hole punching apparatus having a frame, a blade having a tubular cutting edge and a cavity, and a projection on the frame. The blade is movable relative to the frame between a retracted position and a cutting position. The projection moves into the blade cavity as the blade moves from the retracted position into the cutting position.

18 Claims, 10 Drawing Sheets

HOLE PUNCHING APPARATUS

BACKGROUND OF THE INVENTION

1. Field of the Invention

This invention relates to apparatus for punching holes in sheet material, such as paper.

2. Background of Art

It is common to bind multiple sheets of material, such as paper, using fasteners such as rings, string, metal clasps, etc. Holes are normally pre-punched in the sheet material to accept these fasteners.

One conventional apparatus for pre-punching holes in sheet material is shown at 10 in FIGS. 1–4 herein. The hole punching apparatus 10 consists of a frame 12 defining an upwardly facing, flat support surface 14 for multiple pieces of sheet material 16 into which holes 18 are punched. The frame 12 supports two, tubular, cutting blades 20 for movement relative to the frame 12 between a retracted position, as shown in FIG. 3, and a cutting position, as shown in FIG. 2. The frame 12 has two plastic backing elements 22, provided one each beneath the cutting blades 20. A handle 24 is mounted on the frame 12 and is repositionable from a normal position, shown in FIG. 1, to an actuated position, by pivoting movement of the handle 24 in the direction of the arrow 26 to thereby reposition the cutting blades 20 from the retracted position into the cutting position. In so doing, an annular cutting edge 28, at the free end of each cutting blade 20, is driven through either a single piece of sheet material 16 or through stacked pieces of sheet material 16 to against the plastic backing element 22. The frame 12 supports a guide element 30 with an upturned end 32 which is abuttable to an edge of the sheet material 16 facially abutted to the support surface 14 to predetermine the position of the sheet material 16 relative to the cutting blades 20 for consistent location of the holes 18.

In a typical cutting operation, the piece or pieces of sheet material 16 are placed against the support surface 14 and shifted into a throat portion defined by the frame at 34 and at the same time abutted to the upturned end 32 of the guide element 30. The guide element 30 can be appropriately repositioned by movement in the line of the double-headed arrow 36 to cause the desired hole locations on the sheet material 16 to be aligned precisely beneath the cutting blades 20. The handle 24 is then grasped and pivoted in the direction of the arrow 26, whereupon the cutting edges 28 on the cutting blades 20 engage and penetrate through the sheet material 16 so as to form, in this case, circular cut-outs 38 therefrom. As the cutting edges 28 bear on the backing elements 22, the bottommost piece of sheet material 16 is penetrated fully through by the cutting edges 28.

The cutting blades 20 each have an internal cavity 40 into which the cut-outs 38 are pressed during a punching operation. Each cavity 40 has a cross-sectional area that progressively decreases in diameter moving away from the cutting edge 28 a distance D at which point the cavity 40 has its smallest diameter and area. The diameter of the cavity 40 increases beyond the distance D to a diameter slightly smaller than the diameter of the cut-outs 38 so that the cut-outs 38 become slightly compressed. The snugly held cut-outs 38 are allowed to slide within the cavity upwardly, i.e. in the direction of the arrow 42. As each cutting blade 20 moves from the retracted position into the cutting position, the formed cut-outs 38 become squeezed progressively as they move the distance D from the cutting edge 28 through a neck 44 at the distance D. An annular ledge 46 at the neck

44 abuts to, and thereby resists downward passage of, the cut-outs 38 that have moved to thereabove.

Systems, such as that shown in FIGS. 1–4, may have a number of drawbacks. First of all, a substantial force may be required on the handle 24 to direct the cutting blades 20 fully through a stack of sheet material 16. As the cut-outs 38 accumulate in the cavities 40, the accumulating cut-outs 38 progressively increase the resistance to downward movement of the cutting blades 20.

Another problem that may be encountered is that the cut-outs 38 that do not travel upwardly to beyond the necks 44 tend to spring out when the cutting blades 20 are moved back towards the retracted position. This may result in the cut-outs 38 having to be manually removed from the holes 18 in the sheet material 16 and/or cleaned up in the area surrounding the hole punching apparatus 10.

In order to precisely form the holes 18, and to do so with minimal effort, it is necessary that the cutting edges 28 on the cutting blades 20 remain sharp. In the event that the cutting edges 28 become dull, it is desirable to be able to change the cutting blades 20, rather than replace the entire hole punching apparatus 10. Some hole punching apparatus, similar to that shown at 10 in FIGS. 1–4, do not lend themselves to facilitated replacement of the cutting blades 20.

SUMMARY OF THE INVENTION

The invention is directed to a hole punching apparatus having a frame, a blade having a tubular cutting edge and a cavity, and a projection on the frame. The blade is movable relative to the frame between a retracted position and a cutting position. The projection moves into the blade cavity as the blade moves from the retracted position into the cutting position.

With the above construction, the projection can move cut-outs formed in a punching operation sufficiently into the cavity that they do not escape as the blade is moved back into the retracted position.

The hole punching apparatus may further have a drive for rotating the cutting edge around a first axis as the blade moves from the retracted position into the cutting position.

By rotating the cutting edge, cutting of the material in which a hole is to be formed is effected not only by pressure applied in moving the blade towards the cutting position, but also by the rotary movement of the cutting edge. This may reduce the amount of force required to be applied to the blade in moving the blade from the retracted position into the cutting position.

In one form, the cavity has first and second ends spaced along the first axis, with the cutting edge being at the first end of the cavity. The cavity has a diameter taken transversely to the first axis. The diameter of the cavity is non-uniform along the first axis.

In one form, the diameter of the cavity decreases from the cutting edge up to a first predetermined axial distance from the cutting edge towards the second end of the cavity and increases from the first predetermined distance towards the second end of the cavity. The projection extends into the cavity at least the predetermined axial distance from the cutting edge.

The blade may be movable substantially parallel to the first axis between the retracted and cutting positions.

A handle may be provided that is movable relative to the frame between a normal position and an actuated position. The blade is movable from the retracted position into the cutting position as an incident of the handle moving from the normal position into the actuated position.

The handle may be pivotable about an axis as the handle moves between the normal and actuated positions.

The drive may include a drive motor for rotating the cutting edge around a first axis as the blade moves from the retracted position towards the cutting position. A switch may be provided that is placeable selectively in a) an on state to cause activation of the drive motor, and b) an off state to cause deactivation of the drive motor. The switch is moved from the off state into the on state as an incident of the handle moving from the normal position into the actuated position.

The hole punching apparatus may include a blade moving assembly and an adaptor for connecting the blade to the blade moving assembly. The blade moving assembly has a blade holder and a guide case. The blade moving assembly is translatable substantially parallel to the first axis between first and second positions as an incident of which the blade moves from the retracted position into the cutting position, and the blade holder is rotatable relative to the blade moving assembly around the first axis.

The blade may be loosely held by the blade moving assembly so that the blade can be shifted at least transversely to the first axis relative to the blade moving assembly.

The blade moving assembly may be movable from the first position into the second position as an incident of the handle moving from the normal position into the actuated position. The hole punching apparatus may further have a first set of gear teeth which are movable by the handle and a second set of gear teeth on the guide case which cooperate with the first set of gear teeth to cause the blade moving assembly to move from the first position into the second position as an incident of the handle moving from the normal position into the actuated position.

The first set of gear teeth may pivot with the handle about the second axis.

The hole punching apparatus may further include an actuator element which follows pivoting movement of the handle and causes the switch to be changed from the off state into the on state as an incident of the handle moving from the normal position into the actuated position.

A guide bushing may be provided on the frame to guide the blade from the retracted position into the cutting position.

The drive may include a shaft which is rotatable around the first axis, with the shaft being rotatable relative to the guide case around the first axis.

The shaft may be keyed to the blade holder so that the shaft drives the blade holder in rotation around the first axis.

In one form, there is a receptacle for material punched out by the hole punching apparatus on the frame. A passageway is defined through the blade holder and guide case. Material punched out by the hole punching apparatus is capable of communicating through the blade cavity to the passageway and through the passageway to the receptacle for accumulation therein. Provision may be made to empty cut-outs in the receptacle when desired.

In one form, the frame defines a surface to support material on which a hole punching operation is to be performed. The hole punching apparatus may include a pressing assembly which is normally biasably urged away from the support surface. The pressing assembly has a pressing surface which is moved towards the support surface to captively hold material against the support surface as an incident of the blade moving from the retracted position into the cutting position.

The hole punching apparatus may further have a second blade with a second tubular cutting edge and a second cavity. The second blade is movable relative to the frame between a retracted position and a cutting position. A second projection on the frame moves into the second blade cavity as the second blade moves from the retracted position for the second blade into the cutting position for the second blade. The second blade is movable from the retracted position for the second cutting blade into the cutting position for the second blade as an incident of the handle moving from the normal position into the actuated position.

The invention is also directed to a hole punching apparatus having a frame, a blade having a tubular cutting edge and a cavity, and a drive motor. The blade is movable relative to the frame between a retracted position and a cutting position. The drive motor rotates the cutting edge around a first axis as the blade moves from the retracted position into the cutting position.

DETAILED DESCRIPTION OF THE DRAWINGS

Figure 1:
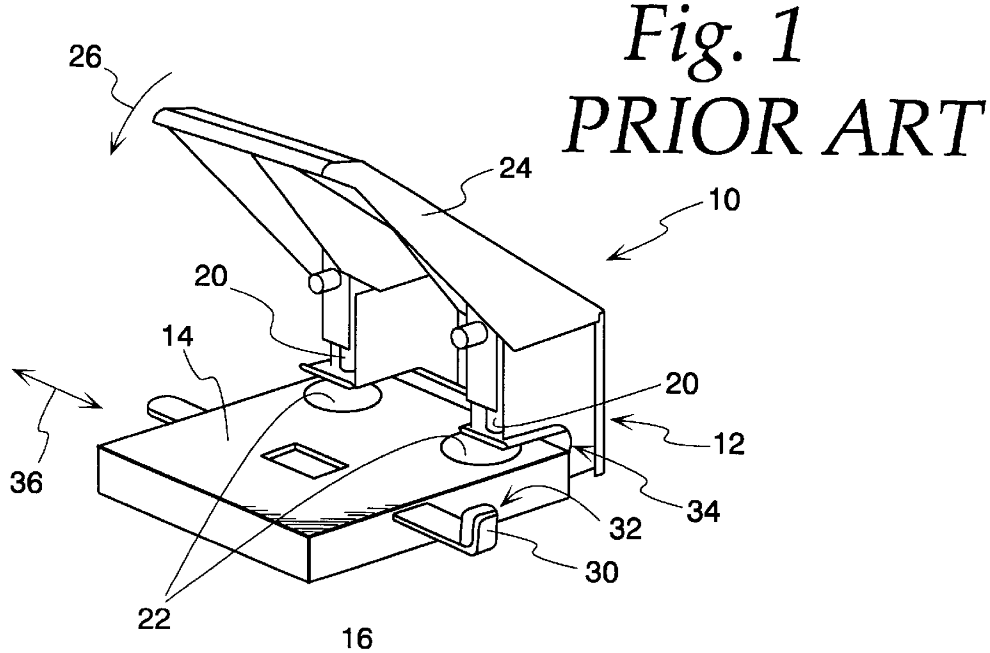
Fig. 1 PRIOR ART
FIG. 1 is a perspective view of a conventional hole punching apparatus.
Figure 4:
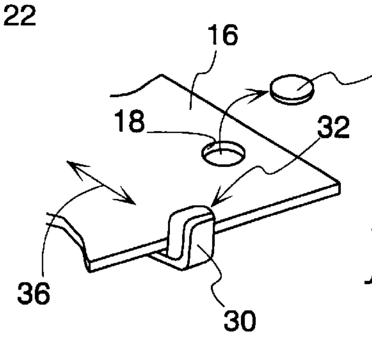
Fig. 4 PRIOR ART
FIG. 4 is an enlarged, fragmentary, perspective view of a part of the hole punching apparatus of FIG. 1 and showing the relationship between a piece of sheet material and a guide element on the frame with a cutout having been formed in the piece of sheet material.
Figure 2:
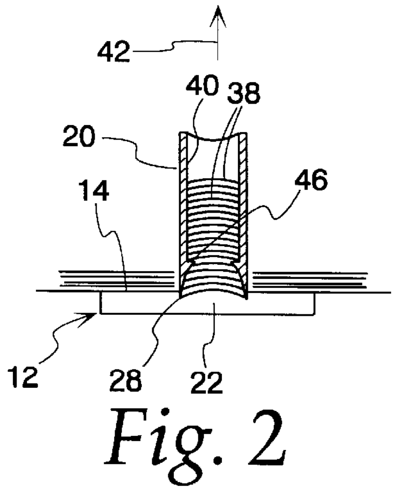
Fig. 2 PRIOR ART
FIG. 2 is an enlarged, fragmentary, partial cross-sectional view of a tubular cutting blade on the hole punching apparatus of FIG. 1 that is extended through several pieces of sheet material, supported on a surface of a frame, fully into a cutting position.
Figure 3:
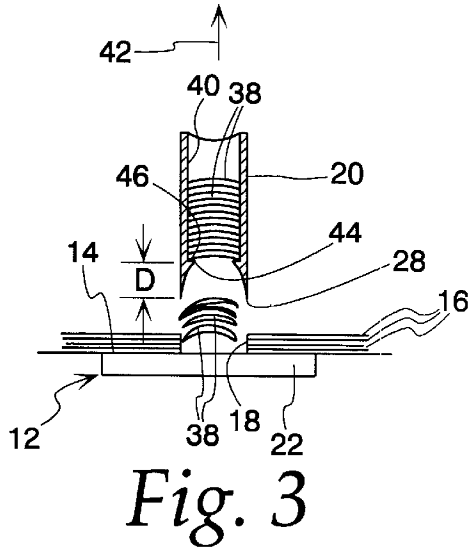
Fig. 3 PRIOR ART
FIG. 3 is a view as in FIG. 2 with the cutting blade repositioned from the cutting position of FIG. 2 into a retracted position.
Figure 5:
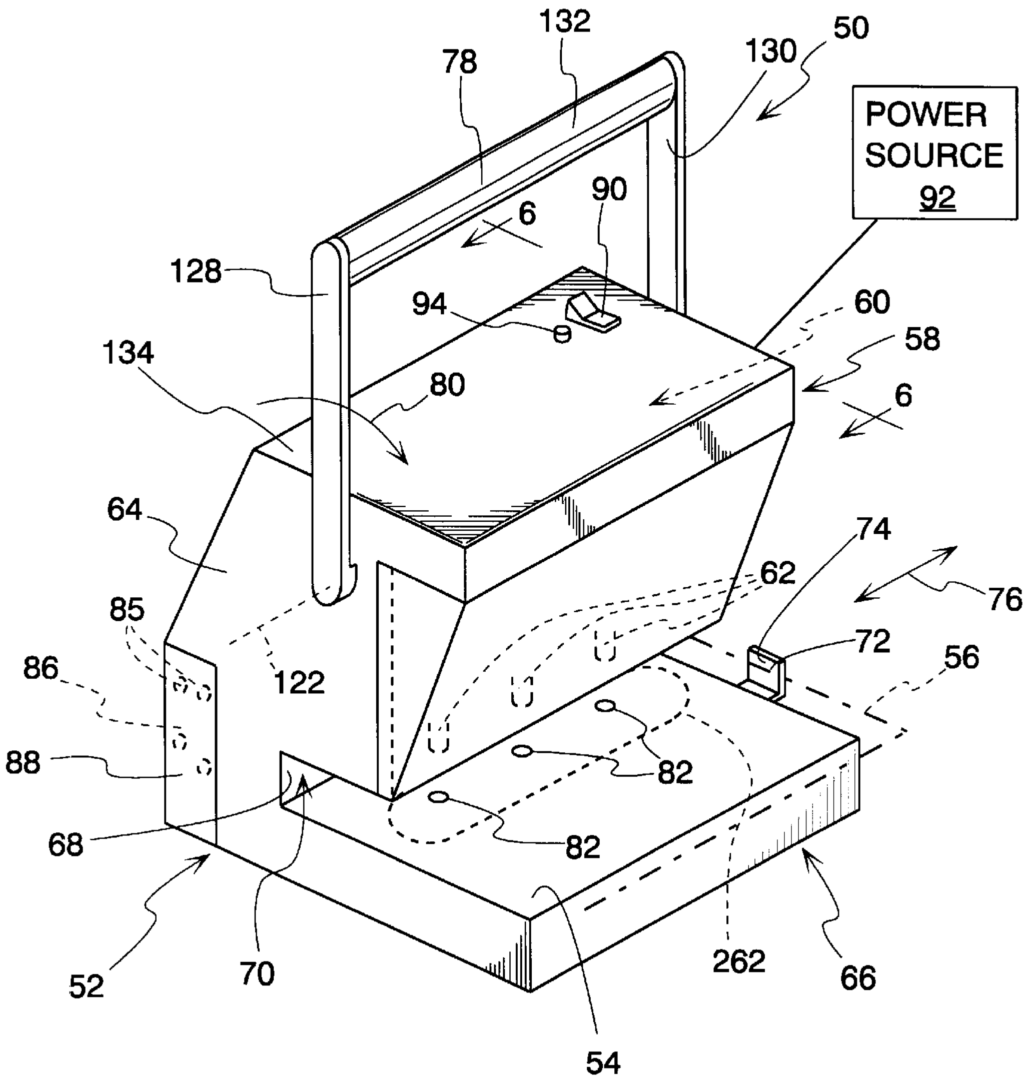
FIG. 5 is a perspective view of a hole punching apparatus, according to the present invention.

Referring initially to FIG. 5, a hole punching apparatus, according to the present invention, is shown at 50. The general operation of the hole punching apparatus 50 is as follows. The hole punching apparatus 50 has a frame 52 which defines a surface 54 for supporting one or more pieces of sheet material 56 through which holes are to be punched. The frame 52 has a housing 58 which defines an upper compartment 60 within which a mechanism for repositioning, in this case three, tubular cutting blades 62. Any number of blades 62, from one to in excess of three, could be provided. The compartment 60 is enclosed by a plastic or metal cover sheet 64 formed into the shape shown and extending downwardly to a base 66 on the frame 52 which defines the support surface 54.

In operation, the pieces of sheet material 56 into which holes are to be punched are placed in a stack facially against the surface 54. One edge of each piece of sheet material 56 is abutted to a forwardly facing wall 68 at the base of a throat 70 defined between the base 66 and upper compartment 60. Consistent lateral positioning of the sheet material 56 relative to the cutting blades 62 is maintained by a guide element 72 having an upturned end 74, to abut to an edge of each piece of sheet material 56, that is transverse to the edges of the sheet material 56 abutted to the throat wall 68. The guide element 72 is adjustable laterally along the base 66, in the line indicated by the double-headed arrow 76.

Figure 8:
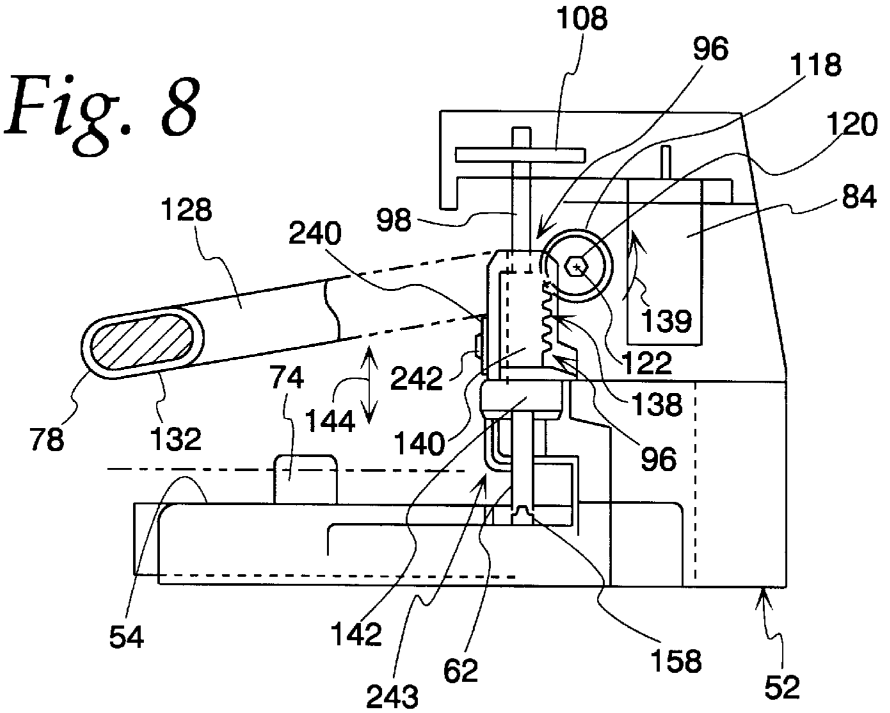
FIG. 8 is a partially schematic, side elevation view of the hole punching apparatus in FIG. 5, partially in cross section and with the cutting blades thereon in the cutting position.
Figure 9:
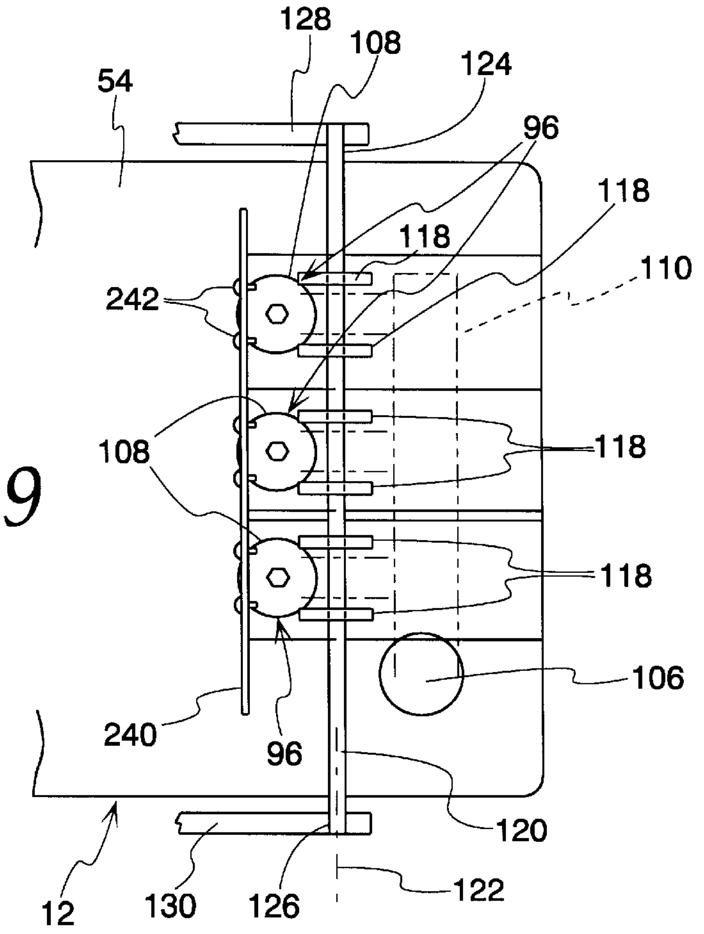
FIG. 9 is a schematic, fragmentary, plan view of the hole punching apparatus in FIG. 5.
Figure 10:
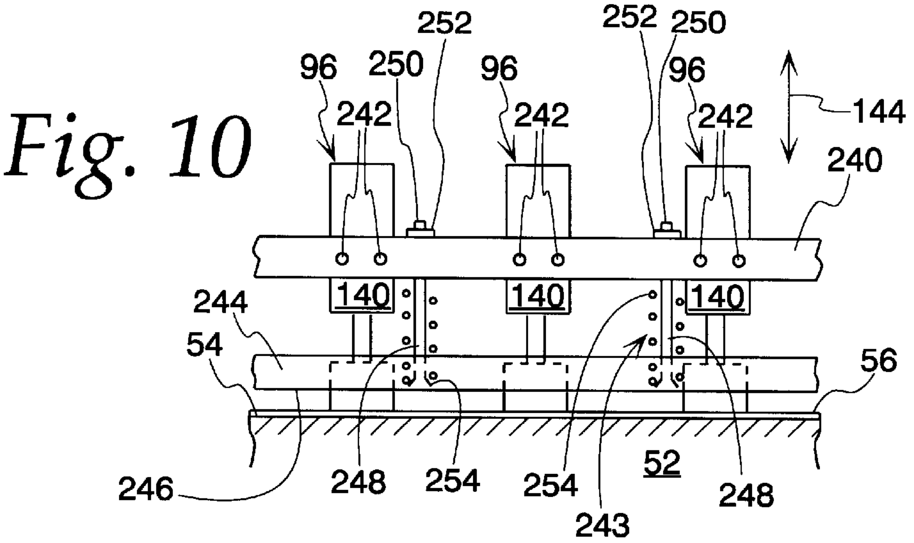
FIG. 10 is a schematic, fragmentary, front elevation view of the hole punching apparatus in FIG. 5 with the cutting blades thereon in a retracted position.

Once the sheet material 56 is properly situated on the support surface 54 of the base 66, a handle 78 is moved from a normal position, shown in FIG. 5, by pivoting in the direction of the arrow 80, to an actuated position (FIG. 8). This causes the cutting blades 62 to advance downwardly through the pieces of sheet material 56 and into openings 82 through the base surface 54, whereupon the pieces of sheet material 56 are severed by each cutting blade 62.

According to the invention, operation of the handle 78 not only translates the cutting blades 62 but activates a drive motor 84 (see FIGS. 6 and 8) to cause each of the cutting blades 62 to rotate around a vertical axis. Return of the handle 78 from the actuated position to the normal position deactivates the motor 84. Cut-outs 85 formed by the cutting blades 62 advance through the cutting blades 62 for accumulation in a receptacle 86 defined by the frame 52. The receptacle 86 is defined by a container 88 that is separable to allow convenient disposal of the cut-outs 85.

An external switch 90 is operable to selectively allow power to be supplied to the motor 84 from a power source 92 and to interrupt the supply of power from the power source 92 to the motor 84. A re-settable breaker 94 is also provided on the frame 52.

The details of the hole punching apparatus 50, as described generally above, are described below with reference to FIGS. 5–25. Each cutting blade 62 is mounted to a blade moving assembly 96 that depends from a shaft 98 which is driven in rotation through the motor 84 about a first, vertical axis 100 that is coincident with a central axis 102 of the tubular cutting blade 62. The motor 84 has a shaft 104 which drives a pulley 106 in rotation. The pulley 106 drives pulleys 108, attached one each to the shafts 98, through a conventional speed reducer 110.

Figure 6:
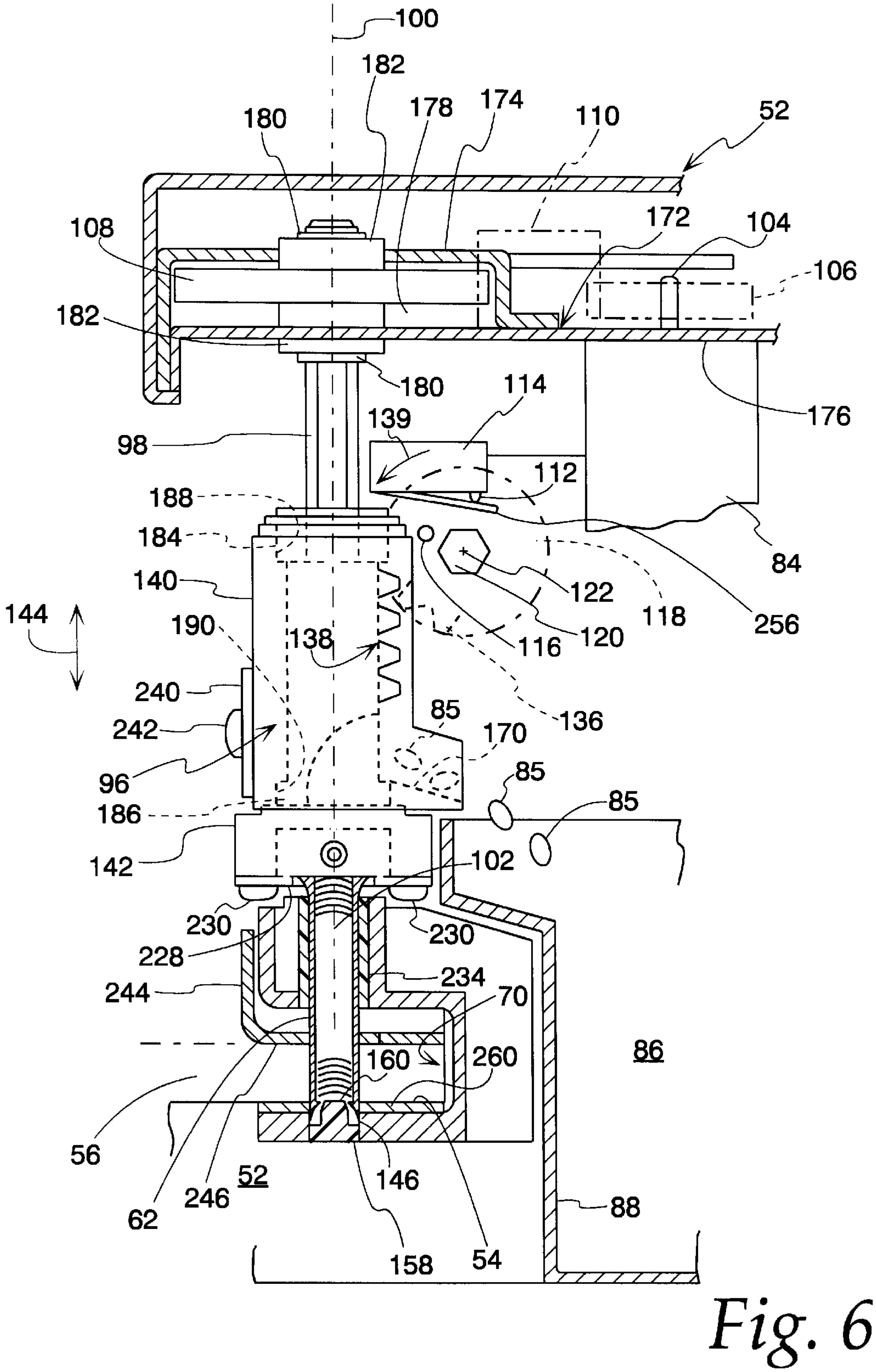
FIG. 6 is an enlarged, cross-sectional view of the hole punching apparatus taken along line 6—6 of FIG. 5 and with cutting blades thereon in a cutting position.

The motor 84 is activated with a button 112 on a micro switch 114 extended as in FIG. 6. Depression of the button 112 deactivates the motor 84. The state of the switch 114 is changed by an actuating element 116 carried on a gear 118, with there being two such gears 118 associated in laterally spaced relationship with each blade moving assembly 96. The gears 118 are carried by a laterally extending shaft 120 which is guided for pivoting movement relative to the frame 52 around a laterally extending axis 122. Opposite ends 124, 126 of the shaft 120 project to externally of the frame 52. The shaft ends 124, 126 connect, one each, to elongate arms 128, 130 defining the handle 78. The elongate arms 128, 130 are in turn connected to a gripping portion 132 so that the gripping portion 132 and elongate arms 128, 130 cooperatively define a U shape. By grasping the gripping portion 132 of the handle 78, the handle 78 can be pivoted in the direction of the arrow 80 in FIG. 5 to reposition the handle 78 from the normal position to the actuated position. The length of the arms 128, 130 is selected so that the user's hand grasping the gripping portion 132 does not contact the upper surface 134 of the upper housing 58 as the handle 78 is moved into the actuated position. Pivoting of the handle 78 about the axis 122 pivots the shaft 120, and the gears 118 thereon, around the axis 122.

Figure 7:
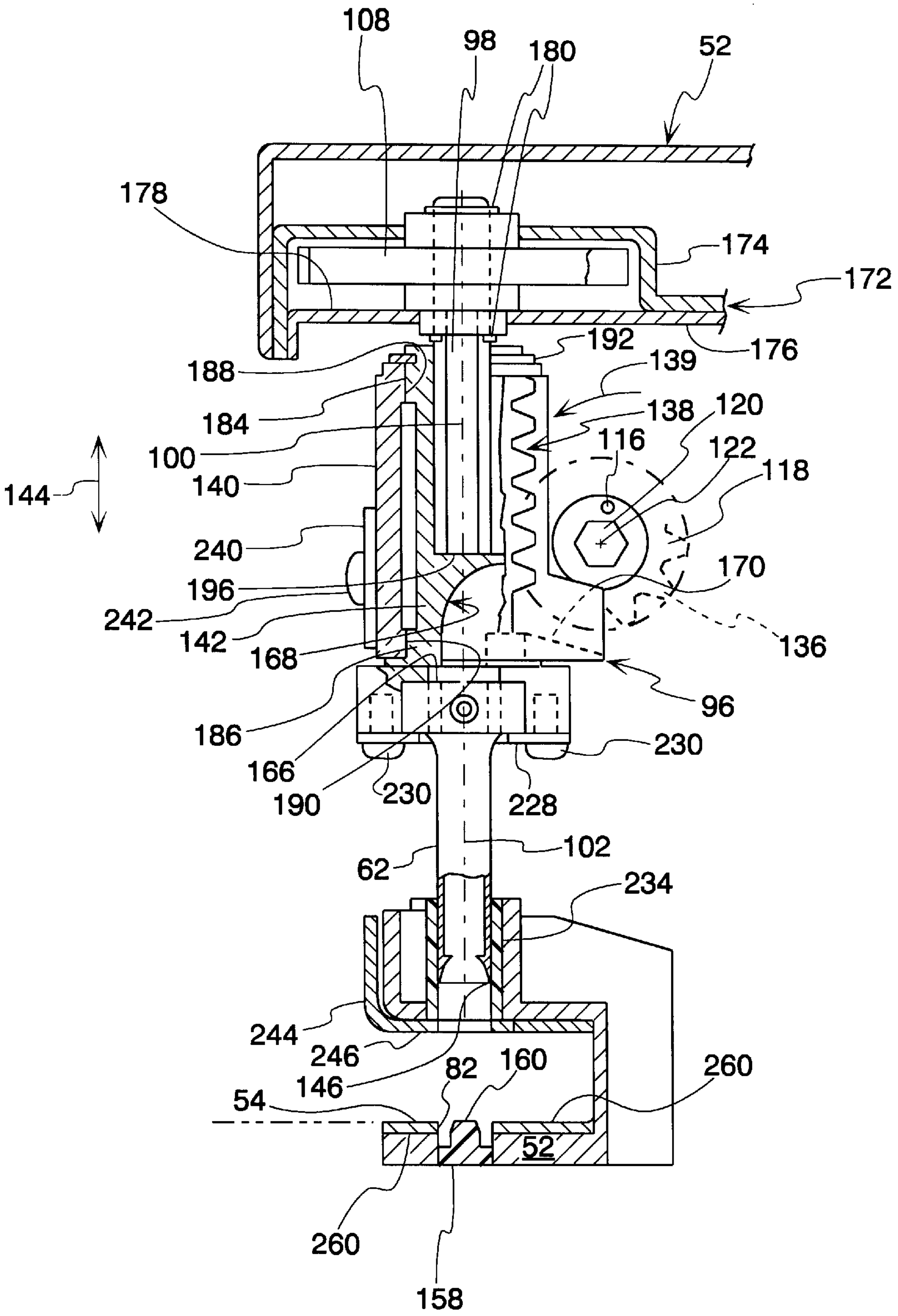
FIG. 7 is a view as in FIG. 6 with the cutting blades in a retracted position.

A first set of teeth 136 is provided in an annular arrangement on each gear 118. The first set of teeth 136 on each gear 118 is in mesh with a second set of teeth 138 in a linear arrangement on the blade moving assembly 96. By pivoting the handle 78 from the normal position of FIG. 5 towards the actuated position of FIG. 8, the shaft 120 rotates in the direction of the arrow 139, causing the blade moving assembly 96 to move from a first position, as shown in FIG. 7, to a second position, as shown in FIG. 6.

The blade moving assembly 96 consists of a guide case 140 on which the second set of teeth 138 are formed, and a blade holder 142 which is movable with the guide case 140 along the axis 100, i.e. in the direction of the double-headed arrow 144, and rotatable guidingly relative to the guide case 140 around the axis 100. Through this arrangement, the blade holder 142, and cutting blade 62 held thereby, can be rotated with the shaft 98 as the blade moving assembly 96 translates downwardly along the axis 100 in moving from the first position into the second position.

By rotating the cutting blade 62 as it is advanced against and through the sheet material 56 in which a hole is to be punched, piercing of the sheet material 56 is effected cooperatively by the rotary action of a free cutting edge 146 at the axial end of the cutting blade 62 and the axial pressure applied to the free cutting edge 146 through operation of the handle 78. As a consequence, less force may be required to be applied to the handle 78 to sever the sheet material 56.

Figure 24:
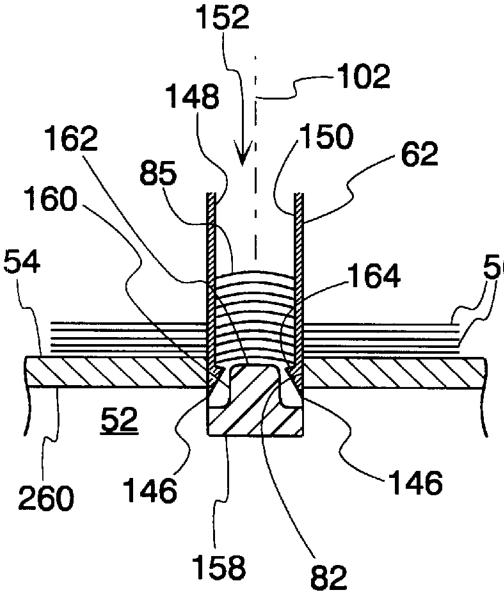
FIG. 24 is an enlarged, fragmentary, cross-sectional view of the cutting blade on the inventive hole punching apparatus of FIG. 5 extended into the cutting position through several pieces of sheet material.
Figure 25:
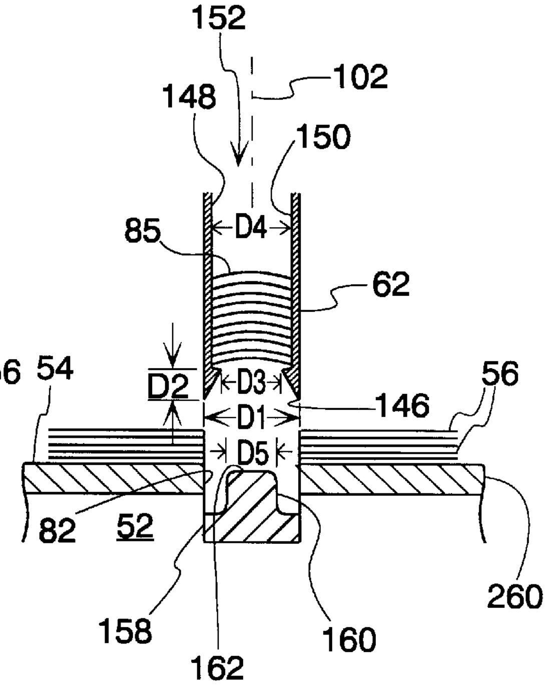
FIG. 25 is a view as in FIG. 24 with the cutting blade moved from the cutting position into the retracted position after the completion of a hole punching operation.

As seen in FIGS. 24 and 25, the cutting blade 62 is tubular, at least adjacent to cutting edge 146, and preferably along the entire axial extent thereof. The cutting blade 62 has a tubular body 148 with axially spaced ends and an inside surface 150 defining a cavity 152 for the accumulation of cut-outs 85 separated from the sheet material 56. The cavity 152 has a cross-sectional area taken transversely to the central axis 102 that is circular with a diameter D1. The cross-sectional area can be other than a circular shape without departing from the invention.

The cross-sectional area of the cavity 152 increases progressively axially away from the cutting edge 146 for a predetermined distance D2 at which point the cavity 152 has the smallest diameter D3. Beyond the distance D2 from the cutting edge 146, the inside surface 150 has a substantially uniform diameter D4 that is slightly less than the diameter of the cut-outs 85. With this arrangement, the cut-outs 85 are radially compressed progressively as they move the distance D2 through the cavity 150, whereupon they are allowed to spring back to only a slightly deformed state beyond the distance D2 within the diameter D4. The cut-outs 85 thus become closely held but are slidable axially in a stacked relationship.

The frame openings 82 through the support surface 54 closely receive the cutting edges 146. An insert 158 made of plastic, or the like, is provided on the frame 52 within each opening 82 and has a projection 160 formed thereon and having a diameter D5 that is less than the diameter D3 of the cavity 152 at the distance D2 from the cutting edge 146, i.e. where the diameter of the cavity 152 is the smallest. The projection 160 has an axial extent selected so that with the cutting blade 62 in the cutting position of FIG. 24, the leading surface 162 of the projection 160 extends into the cavity 152 a distance slightly greater than the distance D2 so that the cut-outs 85 are pressed thereby into the larger diameter portion of the cavity 152 having the diameter D4. An annular, upwardly facing ledge 164 is defined at the distance D2 from the cutting edge 146, with the ledge 164 preventing the cut-outs 85 that are substantially undeformed thereabove, from moving downwardly and escaping from the cavity 152. The cut-outs 85 are consistently pressed by the projection 160 to a position wherein they are held by the ledge 164 as an incident of the cutting blade 62 moving from the retracted position of FIG. 25 into the cutting position of FIG. 24.

As seen in FIGS. 6, 7, 21 and 22, the cavity 152 extends over the full axial extent of each cutting blade 62. Repeated hole punching operations cause cut-outs 85 to accumulate progressively in the cavity 152. The cut-outs 85 eventually fill the cavity 152, after which further punching operations cause the cut-outs 85 to be pressed from the open upper end 166 of the cutting blade 62 from where the cut-outs 85 are guided through a passageway 168, defined cooperatively by the guide case 140 and blade holder 142, to a ramp surface 170 on the guide case 140 (see also FIGS. 13 and 14). The cut-outs 85 are guided by the ramp surface 170 under their own weight to the receptacle 86 for accumulation therein.

The mounting of the blade moving assemblies 96 will now be described in greater detail with reference to FIGS. 6, 7, 13, 14 and 17–22. Each blade moving assembly 96 is supported on one of the shafts 98, which depends from a wall 172 on the frame 52. The wall 172 has two layers 174, 176 which are spaced so as to define a cavity 178 for the pulleys 108. The shaft 98 extends through both layers 174, 176 of the wall 172. Clips 180 attach to the shaft 98 in grooves at locations above and below the wall 172 so that the wall 172 is captive between the clips 180 to maintain the vertical/axial location of the shaft 98 on the frame 52. Bearings 182 facilitate smooth rotation of the shaft 98 around the axis 100 and relative to the frame wall 172.

The blade holder 142 has radially enlarged, axially spaced, ends 184, 186 which are guided for rotation against complementary surfaces 188, 190 on the guide case 140. Clips 192 are pressed into grooves at the ends 184, 186 to maintain a substantially fixed axial relationship between the blade holder 142 and guide case 140, while permitting the blade holder 142 to rotate relative to the guide case 140 around the axis 100.

The blade holder 142 has a bore 193 that is complementary to the cross-sectional shape of the shaft 98. In this embodiment, the shaft 98 and bore 193 have a hexagonal cross-sectional configuration. The bore 193 extends axially downwardly to a partition 194 on the blade holder 142 to which the shaft free end 196 abuts. An opening 198 is provided through a peripheral wall 200 on the blade holder 142. The opening 198, below the partition 194, defines part of the passageway 168 for cut-outs 85 communicating from the cutting blade cavity 152 to the receptacle 86.

At the blade holder end 186, beneath the lower clip 192, is a radially enlarged mounting portion 202. The mounting portion 202 has a stepped bore 204 therethrough which defines a receptacle 206 for an adaptor 208, through which the cutting blade 62 is operatively mounted to the blade holder 142. The adaptor 208 has a generally oval body 210 with oppositely facing flats 212, 214. The body 210 has a through bore 216 to accommodate a fitting 218 on the end of the cutting blade 62.

The fitting 218 has a cylindrical body 220 with an annular undercut 222. With the fitting 218 directed into the bore 216, the undercut 222 aligns with a bore 224 through the adaptor body 210, which receives a locking screw 226. By directing the screw 226 into the bore 224 and tightening the screw 226, the adaptor 208 can be substantially fixed relative to the cutting blade 62.

As an alternative, the undercut 222 can be eliminated. A flattened or concave cavity can be formed at a location as indicated by the “X’s” in FIG. 21, against which the screw 226 can be tightened.

The adaptor 208, with the cutting blade 62 attached thereto, is maintained in the receptacle 206 by a cover plate 228, which is held in place by fasteners 230 and overlies the adaptor 208. The cover plate 228 has a central opening 232 to loosely receive the cutting blade 62.

Preferably, the receptacle 206 has a shape that is complementary to the adaptor 208 and is dimensioned slightly larger than the adaptor 208 to allow the adaptor 208 to shift within the receptacle 206 transversely to the axis 102. This allows the cutting blade 62 to self center in a guide bushing 234 (See also FIGS. 15 and 16) on a guide subassembly on the frame 52, above the support surface 54. The guide bushing 234 can be made from a non-lubricated, low friction material. The central axis 236 of each guide bushing 234 aligns with the central axis of an opening 82 to cause the cutting blades 62 to become accurately aligned with the openings 82. This arrangement prevents binding and assures that the cutting blades 62 can be directed into the openings 82 without any interference.

As seen in FIGS. 6–12, The guide cases 140 are fixedly joined, each to the other, through a bracket 240, secured to each of the guide cases 140 through fasteners 242. The bracket 240 is part of a pressing assembly 243 including a pressing plate 244 with a pressing surface 246 which can be borne against a single piece or stacked pieces of sheet material 56 placed upon the support surface 54 during a punching operation. The pressing assembly 243 includes vertically extending guide rods 248 fixedly attached to the pressing plate 244 and each having an upper end 250 which is slidable guidingly vertically relative to the bracket 240. A retainer 252 on the upper end 250 of each guide rod 248 limits upward sliding movement of the bracket 240 relative to the guide rods 248. A coil spring 254 surrounds each guide rod 248 and acts between the bracket 240 and pressing plate 244.

Figure 11:
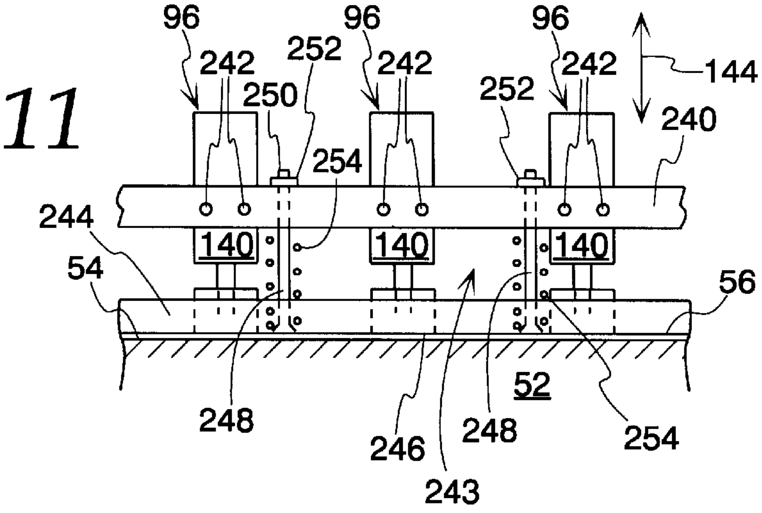
FIG. 11 is a view as in FIG. 10 with the cutting blades being moved towards the cutting position.
Figure 12:
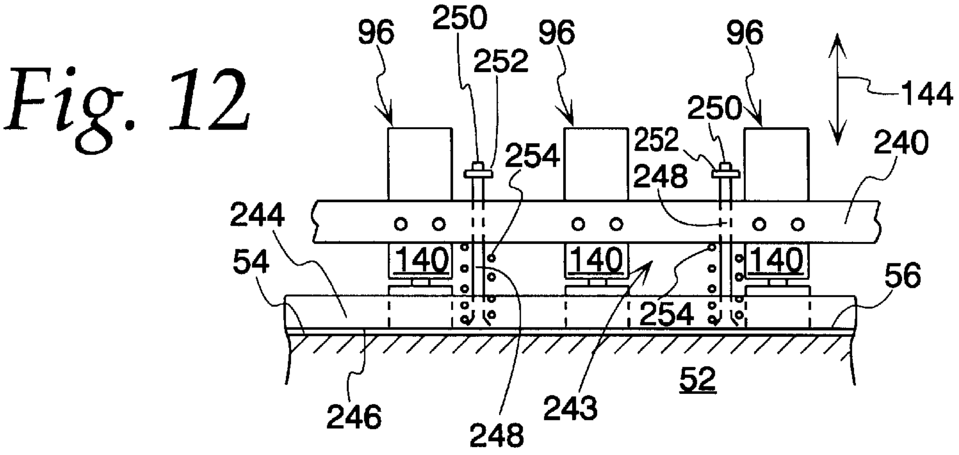
FIG. 12 is a view as in FIGS. 10 and 11 with the cutting blades moved fully into the cutting position.
Figure 13:
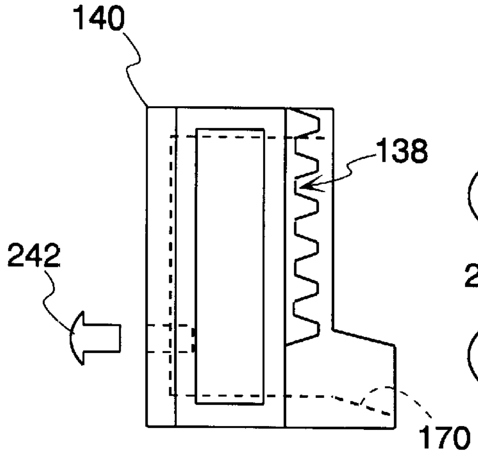
FIG. 13 is an enlarged, side elevation view of a guide case which translates, one each, with a cutting blade between the retracted and cutting positions.
Figure 14:
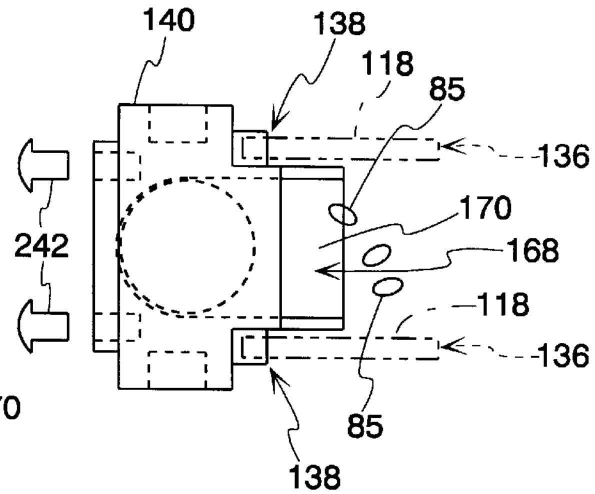
FIG. 14 is an enlarged, plan view of the guide case in FIG. 13.
Figure 15:
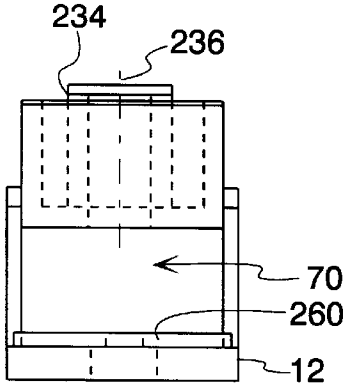
FIG. 15 is an enlarged, front elevation view of a guide subassembly on the frame of the hole punching apparatus of FIG. 5.
Figure 16:
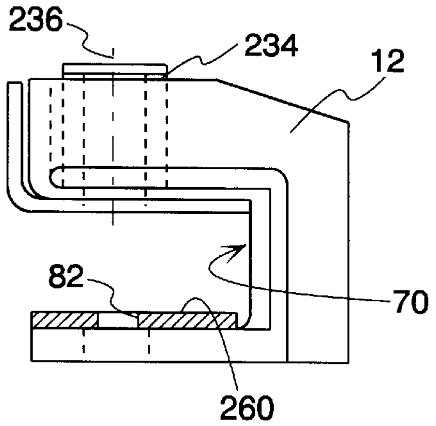
FIG. 16 is an enlarged, side elevation view of the guide subassembly in FIG. 15 partially in cross section.
Figure 17:
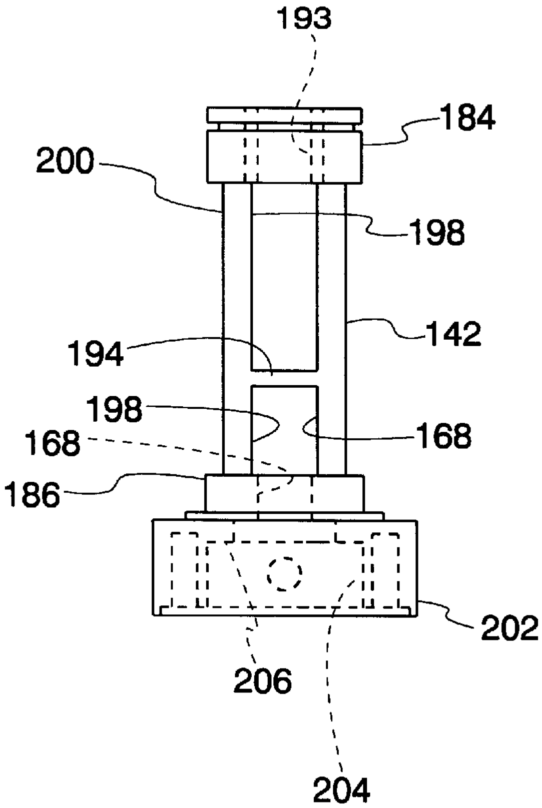
FIG. 17 is an enlarged, elevation view of a blade holder on the hole punching apparatus of FIG. 5.
Figure 18:
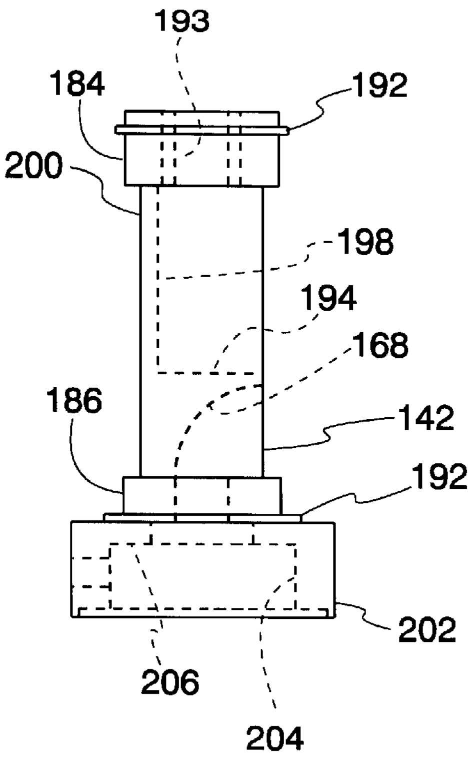
FIG. 18 is an enlarged, elevation view of the blade holder rotated through 90° around a vertical axis from the position shown in FIG. 17.
Figure 19:
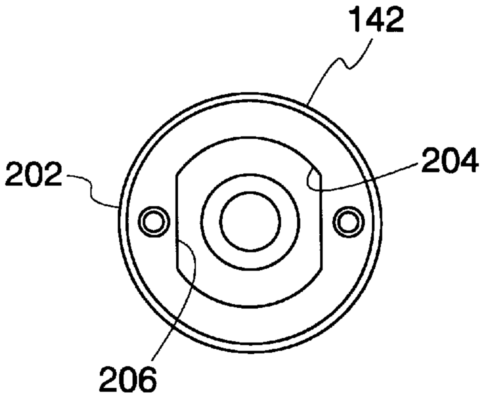
FIG. 19 is an enlarged, bottom view of the blade holder in FIGS. 17 and 18.
Figure 20:
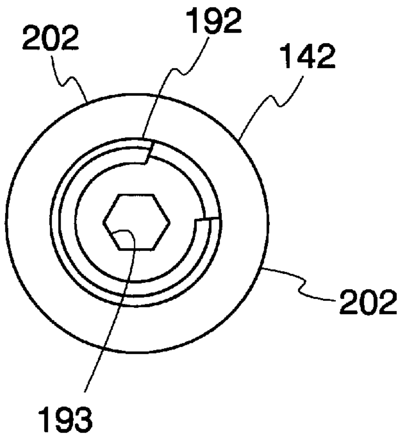
FIG. 20 is an enlarged, plan view of the blade holder in FIGS. 17 and 18.
Figure 21:
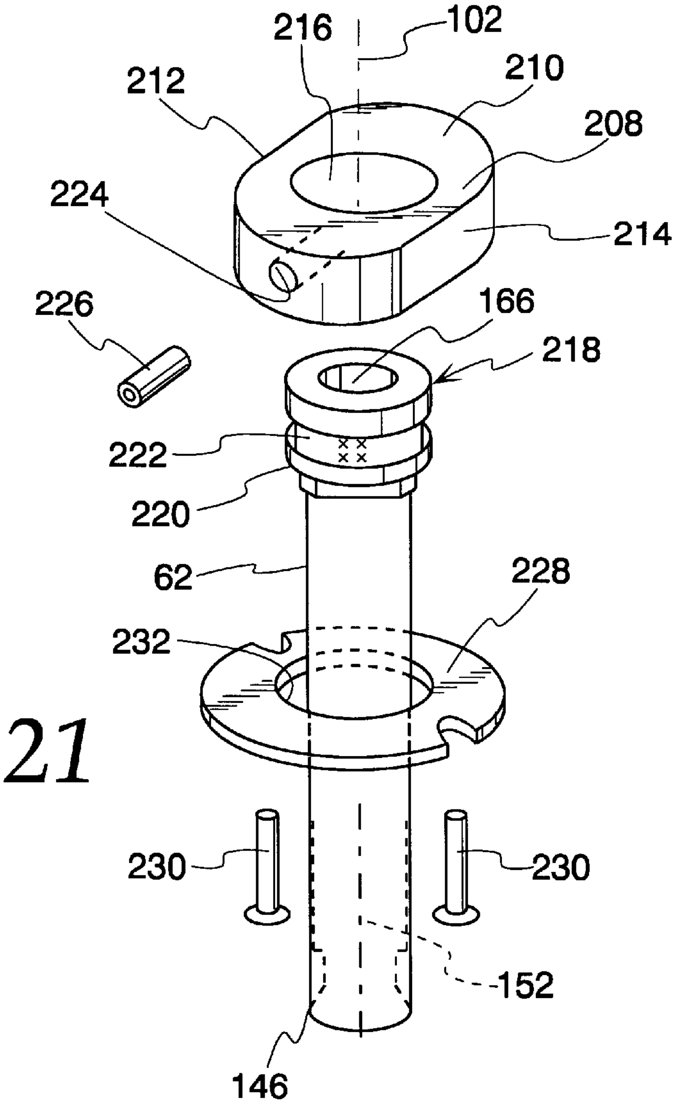
FIG. 21 is an enlarged, exploded, perspective view of a cutting blade on the hole punching apparatus of FIG. 5 and an adaptor system used to mount the cutting blade to the blade holder in FIGS. 17 and 18.
Figure 22:
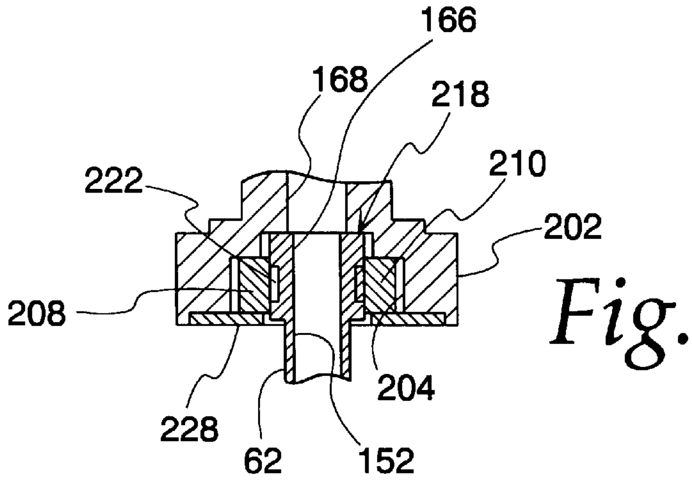
FIG. 22 is an enlarged, fragmentary, cross-sectional view of the connection between the blade holder, cutting blade, and adaptor.
Figure 23:
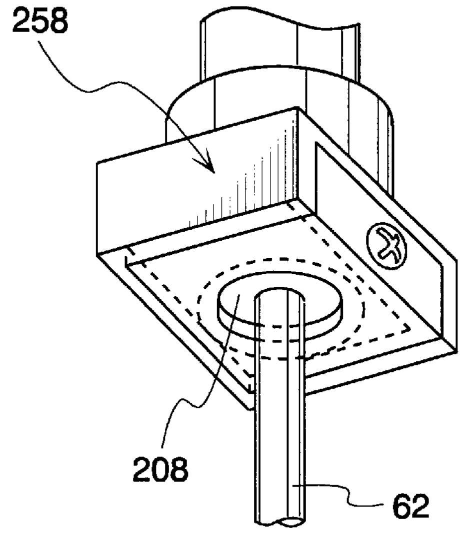
FIG. 23 is an enlarged, bottom, perspective view of the connection between a modified form of blade holder and cutting blade, according to the present invention.

As the handle 78 is moved from the normal to the actuated position, the blade moving assemblies 96 are driven downwardly. As this occurs, as seen in FIG. 11, the bracket 240, through the springs 254, biasably urges the pressing plate 244 downwardly against the sheet material 56 upon the support surface 54. Continued downward movement of the bracket 240, as seen in FIG. 12, compresses the springs 254 to thereby increase the holding force produced by the pressing surface 246 of the pressing plate 244 on the sheet material 56. This firmly, biasably holds the sheet material 56 in a proper position for accurate hole punching. Once the punching operation is completed and the downward pressure on the handle 78 is released, the springs 254 drive the blade moving assemblies 96 upwardly to the first position. In so doing, the shaft 120 rotates so as to return the handle 78 from the actuated position to the normal position therefor.

The overall operation of the hole punching apparatus 50 will now be described. Initially, the hole punching apparatus 50 is plugged in to the power source 92. The power switch 90 is moved form an off position to an on position. With the handle 78 in the normal position, the actuating element 116 is situated as in FIG. 7 to bear a pivoting switch lever 256 (FIG. 6) upwardly under the force of the springs 254 so as to depress the button 112 on the switch 114 and thereby place the switch 114 in an open state. In this state, the conductive path from the power source 92 to the driving motor 84 is interrupted so that the driving motor 84 is deactivated. By moving the handle 78 from the normal position towards the actuated position, the shaft 120 rotates in the direction of the arrow 140, causing the actuating element 116 to separate from the switch lever 256, which pivots downwardly, allowing the button 112 to extend, thereby placing the switch 114 in an on state and forming a conductive path from the power source 92 to the driving motor 84 to activate the driving motor 84. Upon activation of the motor 84, rotation therefrom is imparted through the pulley 16, the speed reducer 110, and pulleys 108 to the shafts 98, which rotate the blade holders 142 and the cutting blades 62 around the axis 102. At the same time, the shaft 120 rotates the gears 118, which drive the guide cases 146 downwardly, thereby moving the blade moving assemblies 96 from the first position of FIG. 7, in which the cutting blades 62 are in the retracted position, to the second position of FIG. 6, wherein the cutting blades 62 are in the cutting position. As the handle 78 is moved from the normal position towards the actuated position, the pressing assembly 243 moves downwardly, initially causing the pressing plate 244 to contact the sheet material 56 on the support surface 54 and ultimately to increase a captive force produced by the pressing plate 244 thereon. During the punching operation, the cut-outs 85 are separated from the sheet material 56 and driven upwardly into the cavities 152 by the projections 160. Eventually, after repeated punching operations, the cavities 152 fill with cut-outs 85, which then move through the passageways 168 through the guide cases 140 and blade holders 142 and are guided by the ramp surfaces 170 on the guide cases 140 into the receptacle 86 for accumulation. The removable container 88, which defines at least a part of the receptacle 86, can be separated from the remainder of the frame 52 to dispose of the cut-outs 85.

In the event that the load on the drive motor 84 becomes excessive, the breaker 94 may be thrown to prevent damage to the drive motor 84. The breaker 94 can be re-set after the condition causing the overload has been remedied. Once the punching operation has been completed, the handle 78 is released and is driven by the springs 254 back into the normal position therefor.

The hole punching apparatus 50 described is susceptible to many different variations without departing from the spirit of the invention. For example, in FIG. 23, the mounting portion 202, previously described, which has a cylindrical shape, is shown replaced by a square mounting portion 258 which functions in substantially the same manner as the mounting portion 202.

The above-described cooperation between each cutting blade 62 and projection 160 can be realized whether or not the cutting blade 62 is rotating. Accordingly, the inventive concept can be used in a hole punching apparatus which uses a cutting blade 62 that moves in translation only i.e. that is not rotated.

The invention also affords the ability to change the configuration of the holes punched thereby, be it a change in diameter or shape. With the above-described arrangement, the cutting blade 62 and adaptor 208 can be readily removed and replaced by a different cutting blade which can be similarly held by the adaptor 208. The bushing 234 can be replaced by a bushing which is complementary to the newly attached cutting blade. Since the openings 82 should closely accommodate the cutting blades 62, openings 82 of different shape and diameter may be necessary. To facilitate this, the entire upper surface 54 may be defined by a separable layer 260. Layers with appropriate openings may be interchanged. Alternatively, a removable insert such as that shown at 262 (FIG. 5) can be used. The insert 262 defines only a part of the support surface 54. By interchanging inserts 262, changing of the dimension of the openings 82 through the support surface 54 can be more readily accomplished.

In another aspect of the invention, the projection 160 is defined on the insert 158 that is press fit to the frame 52 through the opening 82. Each insert 158 can be removed from the opening 82 to allow replacement thereof with an insert having a different shape or dimension to accommodate the cutting blade 62 that is selected.

The foregoing disclosure of specific embodiments is intended to be illustrative of the broad concepts comprehended by the invention.

What is claimed is:

1. A hole punching apparatus comprising:

a frame having surface for supporting a workpiece to be cut and a recess in said support surface;

a blade having a tubular cutting edge and a cavity with a diameter, the blade having first and second ends with the cutting edge being at the first end of the blade, the blade being rectilinearly movable relative to the frame between a retracted position and a cutting position, the blade in said cutting position residing in the recess;

a projection in said recess which moves into the blade cavity as the blade moves from the retracted position into the cutting position, wherein the diameter of the cavity decreases from the cutting edge up to a first predetermined axial distance from the cutting edge towards the second end of the blade and increases from the first predetermined distance towards the second end of the blade, wherein the projection extends into the cavity at least the predetermined axial distance from the cutting edge when said blades in the cutting position such that a cutout from said workplace is advanced past said decreased diameter portion of said cavity; and a drive for rotating the cutting edge around a first axis as the blade moves from the retracted position into the cutting position.

2. The hole punching apparatus according to claim 1 wherein the frame defines a surface to support material on which a hole punching operation is to be performed, and further comprising a pressing assembly which is normally biasably urged away from the support surface, the pressing assembly having a pressing surface which is moved towards the support surface to captively hold material against the support surface as an incident of the blade moving from the retracted position into the cutting position.

3. The hole punching apparatus according to claim 1 wherein the hole punching apparatus comprises a second blade having a second tubular cutting edge and second cavity, the second blade being movable relative to the frame between a retracted position and a cutting position, and a second projection on the frame which moves into the second cavity as the second blade moves from the retracted position for the second blade into the cutting position for the second blade, wherein the second blade is movable from the retracted position for the second blade into the cutting position for the second blade as an incident of the handle moving from the normal position into the actuated position.

4. The hole punching apparatus according to claim 1 wherein the cavity has first and second ends spaced along the first axis, the cutting edge is at the first end of the cavity, the cavity has a diameter taken transversely to the first axis, and the diameter of the cavity is non-uniform along the first axis.

5. The hole punching apparatus according to claim 4 wherein the projection extends into the cavity further than the predetermined axial distance from the cutting edge.

6. The hole punching apparatus according to claim 1 further comprising a handle that is movable relative to the frame between a normal position and an actuated position, the blade being movable from the retracted position into the cutting position as an incident of the handle moving from the normal position into the actuated position.

7. The hole punching apparatus according to claim 6 wherein the handle is pivotable about an axis as the handle moves between the normal and actuated positions.

8. The hole punching apparatus according to claim 6 further comprising a drive motor for rotating the cutting edge around a first axis as the blade moves from the retracted position toward the cutting position and a switch that is placeable selectively in a) an on state to cause activation of the drive motor and b) an off state to cause deactivation of the drive motor, wherein the switch is moved from the off state into the on state as an incident of the handle moving from the normal position into the actuated position.

9. The hole punching apparatus according to claim 1 further comprising a blade moving assembly and an adaptor for connecting the blade to the blade moving assembly, the blade moving assembly comprising a blade holder and a guide case, the blade moving assembly being translatable substantially parallel to the first axis between first and second positions as an incident of which the blade moves from the retracted position into the cutting position wherein the blade holder is rotatable relative to the guide case around the first axis.

10. The hole punching apparatus according to claim 9 wherein the blade is loosely held by the blade moving assembly so that the blade can be shifted at least transversely to the first axis relative to the blade moving assembly.

11. The hole punching apparatus according to claim 10 wherein there is a guide bushing on the frame which guides the blade as the blade moves from the retracted position into the cutting position.

12. The hole punching apparatus according to claim 9 further comprising a handle that is movable relative to the frame between a normal position and an actuated position, the blade moving assembly being movable from the first position into the second position as an incident of the handle moving from the normal position into the actuated position, the hole punching apparatus further comprising a first set of gear teeth which are movable by the handle and a second set of gear teeth on the guide case which cooperate with the first set of gear teeth to cause the blade moving assembly to move from the first position into the second position as an incident of the handle moving from the normal position into the actuated position.

13. The hole punching apparatus according to claim 12 wherein the handle is pivotable about a second axis as the handle moves between the normal and actuated positions and the first set of gear teeth pivot with the handle about the second axis.

14. The hole punching apparatus according to claim 13 further comprising a switch that is placeable selectively in a) an on state to cause activation of the drive and b) an off state to cause deactivation of the drive and an actuator element, the actuator element following pivoting movement of the handle and causing the switch to be changed from the off state into the on state as an incident of the handle moving from the normal position into the actuated position.

15. The hole punching apparatus according to claim 9 wherein the drive comprises a shaft which is rotatable around the first axis and the shaft is rotatable relative to the guide case around the first axis.

16. The hole punching apparatus according to claim 15 wherein the shaft is keyed to the blade holder so that the shaft drives the blade holder in rotation around the first axis.

17. The hole punching apparatus according to claim 9 wherein there is a receptacle for material punched out by the hole punching apparatus on the frame, there is a passageway defined through the blade holder and guide case, and material punched out by the hole punching apparatus is capable of communicating through the blade cavity to the passageway and through the passageway to the receptacle for accumulation therein.

18. The hole punching apparatus according to claim 1 wherein the blade is movable substantially parallel to the first axis between the retracted and cutting positions.

* * * * *

UNITED STATES PATENT AND TRADEMARK OFFICE

CERTIFICATE OF CORRECTION

PATENT NO. : 6,540,451 B1
DATED : April 1, 2003
INVENTOR(S) : Makoto Mori

It is certified that error appears in the above-identified patent and that said Letters Patent is hereby corrected as shown below:

Title page,
Insert Item:
-- [30] Foreign Application Priority Data

Japanese Application No. 10-290514 filed October 13, 1998. --

Column 11,
Line 14, should read as follows: -- when said blade is in the cutting position such that a --

Signed and Sealed this

Sixteenth Day of December, 2003

JAMES E. ROGAN
*Director of the United States Patent and Trademark Office*